United States Patent
Cho et al.

(10) Patent No.: US 7,463,441 B2
(45) Date of Patent: Dec. 9, 2008

(54) AUTOMATIC DATA UPDATE METHOD OF DATA STORAGE SYSTEM AND DISK DRIVE USING THE SAME

(75) Inventors: Sung-youn Cho, Seoul (KR); Ho-joong Choi, Suwon-Si (KR); Seung-youl Jeong, Hwaseong-si (KR); Jong-lak Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 90 days.

(21) Appl. No.: 11/036,348

(22) Filed: Jan. 18, 2005

(65) Prior Publication Data

US 2005/0168859 A1  Aug. 4, 2005

(30) Foreign Application Priority Data

Jan. 30, 2004  (KR) .................... 10-2004-0006116

(51) Int. Cl.
   *G11B 15/04*   (2006.01)
(52) U.S. Cl. ........................................ 360/60
(58) Field of Classification Search ............. 360/31, 360/53, 48, 60, 75, 77.02, 78.04; 711/111, 711/114; 714/7, 8; 386/125; 703/23
   See application file for complete search history.

(56) References Cited

U.S. PATENT DOCUMENTS

| 5,535,372 | A | * | 7/1996 | Benhase et al. ............... 703/23 |
| 5,812,755 | A | * | 9/1998 | Kool et al. ...................... 714/8 |
| 6,021,509 | A | * | 2/2000 | Gerdt et al. ..................... 714/7 |
| 6,201,655 | B1 | * | 3/2001 | Watanabe et al. ............. 360/53 |
| 6,449,111 | B1 | * | 9/2002 | Kool et al. ..................... 360/48 |
| 6,715,030 | B1 | * | 3/2004 | Vandenbergh et al. ....... 711/111 |
| 2004/0193798 | A1 | * | 9/2004 | Kuwamura .................. 711/114 |
| 2005/0069298 | A1 | * | 3/2005 | Kasiraj et al. ................ 386/125 |

FOREIGN PATENT DOCUMENTS

| EP | 0114255 | 8/1984 |
| EP | 0581362 | 2/1994 |
| EP | 1457981 | 9/2004 |
| JP | 63-081662 | 4/1988 |
| JP | 63-157368 | 6/1988 |
| JP | 04-349271 | 12/1992 |
| JP | 07-182250 | 7/1995 |

* cited by examiner

*Primary Examiner*—Fred Tzeng
(74) *Attorney, Agent, or Firm*—Staas & Hasley LLP

(57) ABSTRACT

A data storage device and method of controlling the same. An automatic data update method of a data storage system, includes: counting a number of times a write mode is executed in tracks adjacent to each track of a storage medium; reading data stored in one of the tracks of the storage medium when the number of times the write mode is executed in any tracks adjacent to the one of the tracks exceeds a specified threshold value; and re-writing the read data to the one of the tracks.

11 Claims, 3 Drawing Sheets

AUTOMATIC DATA UPDATE METHOD OF DATA STORAGE SYSTEM AND DISK DRIVE USING THE SAME

CROSS-REFERENCE TO RELATED APPLICATION

This application claims the priority of Korean Patent Application No. 2004-6116, filed on Jan. 30, 2004, in the Korean Intellectual Property Office, the disclosure of which is incorporated herein in by reference.

BACKGROUND OF THE INVENTION

1. Field of the Invention

The present invention relates to a data storage device and method of controlling the same, and more particularly, to an automatic data update method of data storage system and disk drive using the same, which can prevent data loss in adjacent tracks, caused by an increase of magnetic field due to repeated write operation.

2. Description of Related Art

A hard disk drive, one type of known data storage devices, contributes to computer system operation by reading/writing data from/on disk using a magnetic head. Due to higher capacity, higher density and miniaturization of hard disk drives, Bit Per Inch (BPI) and Track Per Inch (TPI) tend to increase so much that increasingly delicate mechanisms are required. Here, the BPI is a density in a rotational direction of a disk and the TPI is a density in a radial direction of the disk.

As the number of times a write operation is performed in a track, the magnetized region of disk is widened, thus influencing data written on adjacent tracks. Specifically, disks having large TPI are vulnerable to an influence of the write operations of adjacent tracks.

A set-top box, one type of host device, records data automatically. When a hard disk drive is employed in audiovisual (AV) environment, an operation of writing data to a corresponding region is performed automatically regardless of user manipulation when the set-top box is powered on. Due to these operations, the number of times of repeatedly writing data to a specified region increases.

A hard disk drive is a device that records data by generating magnetic field from a head and magnetizing a disk. When a specified region is magnetized excessively due to repeated write operations, the magnetized region is gradually widened, thus causing data of adjacent tracks to be erased.

Up to now, technologies for preventing these phenomena have not been developed. Therefore, when the number of write times increases, the magnetization is so severe that data written on the adjacent tracks may be erased.

BRIEF SUMMARY

An aspect of the present invention provides an automatic data update method of data storage system and a hard disk drive using the same, which are capable of updating data before adjacent tracks' data are erased by monitoring the number of write times in the adjacent tracks according to each track.

According to an aspect of the present invention, there is provided an automatic data update method of a data storage system, including: counting a number of times a write mode is executed in tracks adjacent to each track of a storage medium; reading data stored in one of the tracks of the storage medium when the number of times the write mode is executed in any tracks adjacent to the one of the tracks exceeds a specified threshold value; and re-writing the read data to the one of the tracks.

According to another aspect of the present invention, there is provided a hard disk drive, including: a disk which stores cylinder count information and user information, the cylinder count information being providing by accumulating the number of write mode execution in adjacent tracks of each track of a disk; a buffer which stores data received from the host device through the host interface in a write mode, and stores data read from the disk in a read mode; a controller which analyzes a command received through a host interface and, when the command is a write command, the controller increases the cylinder count information of tracks adjacent to a track which is to be written according to the write command, and, when the cylinder count information of any of the adjacent tracks exceeds a specified threshold value, the controller reads out data stored in the any of the adjacent tracks and re-writes the read data to the same any of the adjacent tracks; and a write/read circuit which writes data stored in the buffer to the disk, or reads data from the disk and writes the read data to the buffer.

According to another embodiment of the present invention, there is provided a method of preventing data erasure, including: counting a number of times tracks adjacent to a track of a storage medium are written; reading data stored in the track when the number of times the any of the adjacent tracks are written exceeds a specified threshold; and re-writing the read data to the track.

According to another embodiment of the present invention, there is provided a method of preventing data erasure, including: storing cylinder count information relating to a number of writes operations performed in adjacent tracks of each track of a disk; storing data received from a host device in a write mode, and storing data read from the disk in a read mode; and analyzing a received command and, when the command is a write command, increasing the cylinder count information of tracks adjacent to a track which is to be written according to the write command, and, when the cylinder count information of any of the adjacent tracks exceeds a specified threshold, reading out data stored in the any of the adjacent tracks and re-writing the read data to the same any of the adjacent tracks.

According to another embodiment, there is provided computer readable storage media encoded with processing instructions for executing the aforesaid methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
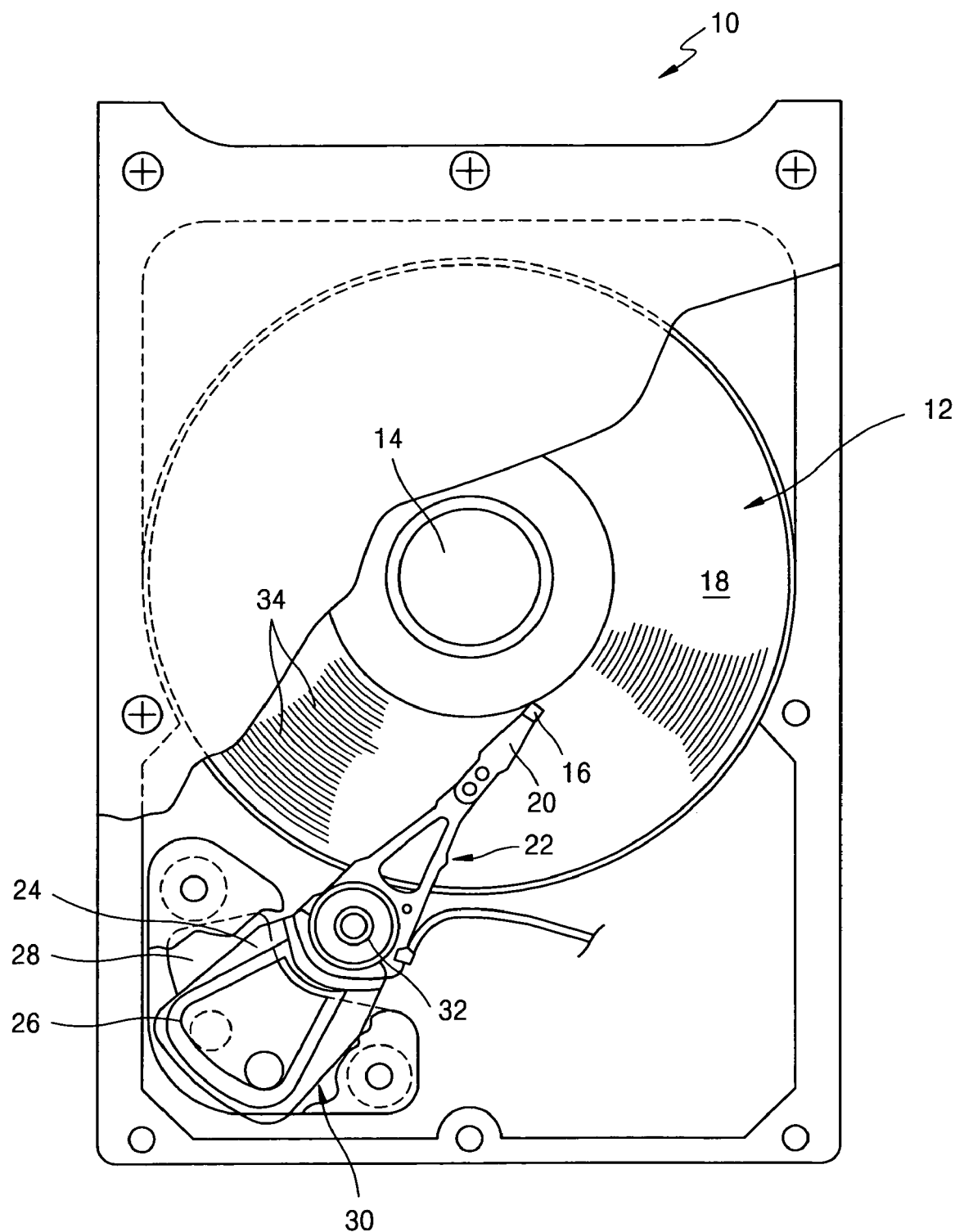
FIG. 1 is a top view of a hard disk drive to which an embodiment of the present invention is applicable.

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 1 illustrates a construction of a hard disk drive 10 to which an embodiment of the present invention is applicable. The hard disk drive 10 includes at least one magnetic disk 12 that is rotated by a spindle motor 14. Also, the hard disk drive 10 includes a transducer 16 that is positioned adjacent to a disk surface 18.

The transducer 16 reads and/or writes information from and/or to the rotating disk 12 by sensing and/or magnetizing the magnetic field from or to the disk 12. Typically, the transducer 16 is coupled to the disk surface 18. Although the single transducer 16 is drawn, it is to be understood that the transducer 16 is separately provided with a write transducer for magnetizing the disk 12 and a read transducer for sensing magnetic field from the disk 12. The read transducer may be made of Magneto-Resistive (MR) elements. The transducer 16 is generally referred to as head.

The transducer 16 may be formed integrally together with a slider 20. The slider 20 is configured to generate an air bearing between the transducer 16 and the disk surface 18. The slider 20 is incorporated into a head gimbal assembly (HGA) 22. The head gimbal assembly 22 is attached to an actuator arm 24 which has voice coil 26. The voice coil 26 is positioned adjacent to a magnetic assembly 28 that defines a voice coil motor (VCM) 30. If current is applied to the voice coil motor 26, torque is generated to rotate an actuator arm 24 with respect to a bearing assembly 32. Rotation of the actuator arm 24 causes the transducer 16 to move across the disk surface 18.

Information is stored within annular tracks 34 of the disk 12. Each of the tracks 34 includes a plurality of sectors, each of which has data field and identification field. Also, the identification field includes gray code that identifies a sector and a track (or cylinder). The transducer 16 moves across the disk surface 18 to read or write information from or to the tracks.

A maintenance field is provided in a specific region of the disk 12. Data and cylinder count information that are necessary for operation of the hard disk drive are stored in the maintenance field.

The cylinder count information is information on the count number of writings to adjacent tracks.

Figure 2:
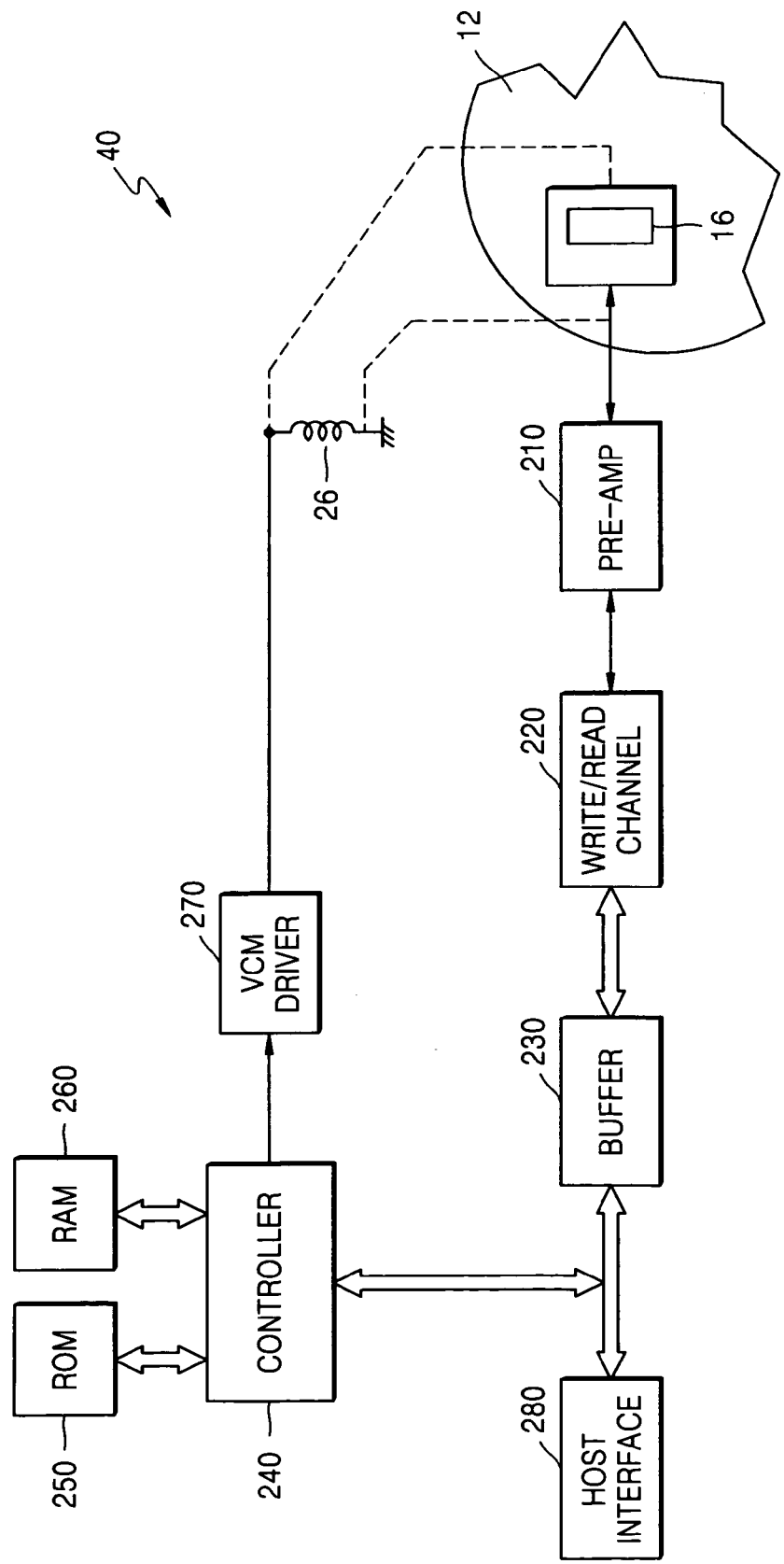
FIG. 2 illustrates an electrical circuit configuration of the hard disk drive of FIG. 1.

FIG. 2 illustrates an electrical circuit of the hard disk drive of FIG. 1.

Referring to FIG. 2, the hard disk drive according to the present embodiment includes a disk 12, a transducer 16, a pre-amp 210, a write/read channel 220, a buffer 230, a controller 240, a read-only memory (ROM) 250, a random access memory (RAM) 260, a VCM driver 270, and a host interface 280.

A circuit configuration that includes the pre-amp 210 and the write/read channel 220 is referred to as a write/read circuit.

The ROM 250 stores various programs and data for control of the disk drive. The ROM 250 stores program and data for executing the method illustrated by the flowchart of FIG. 3. The RAM 260 loads data and cylinder count information for operation of the disk drive, which are read out from the maintenance field of the disk 12 each time the disk drive is booted.

A general operation of the disk drive will now be described below.

In a data read mode, the disk drive enables the pre-amp 210 to amplify electric signals, which are sensed from the disk 12 by the transducer (head) 16, for convenient signal processing. Then, the write/read channel 220 encodes amplified analog signals into digital signals that are readable by a host device (not shown), and converts them into stream data. The stream data are temporarily stored in the buffer 230 and transmitted to the host device through the host interface 280.

In a data write mode, the disk drive receives data from the host device through the host interface 280 and temporarily stores them in the buffer 230. The data stored in the buffer 230 are sequentially outputted and the write/read channel 220 converts the data into binary data streams, which are adaptable for the write channel. The binary data streams are amplified by the pre-amp 210 and then written on the disk 12 by the transducer 16.

The controller 240 collectively controls the disk drive. Also, the controller 240 analyzes commands that are received through the host interface 280, and controls execution of corresponding commands. Specifically, when the received command is a write command, cylinder count information of a track adjacent to the track that is to be written is increased. When the cylinder count information of the adjacent track exceeds a threshold value, data stored in the adjacent track are read out and re-written to the same track.

The controller 240 controls a loading of the cylinder count information of the disk 12 on the RAM 260 each time the disk is booted and increases the cylinder count information of tracks adjacent to a to-be-written track at every input of the write command. The controller 240 controls a reset of the cylinder count information of the track to be written according to the write command to zero. Also, the controller 240 controls a storing of the cylinder count information of the RAM 260 into the disk 12 prior to a power down.

The controller 240 is coupled to the VCM driver 270 that supplies a driving current to the voice coil 26. The controller 240 supplies control signal to the VCM driver 270 in order to control an excitation of the voice coil motor and a motion of the transducer 16.

An automatic data update method for a hard disk drive, which is executed by control of the controller 240, will now be described with reference to FIG. 3.

Figure 3:
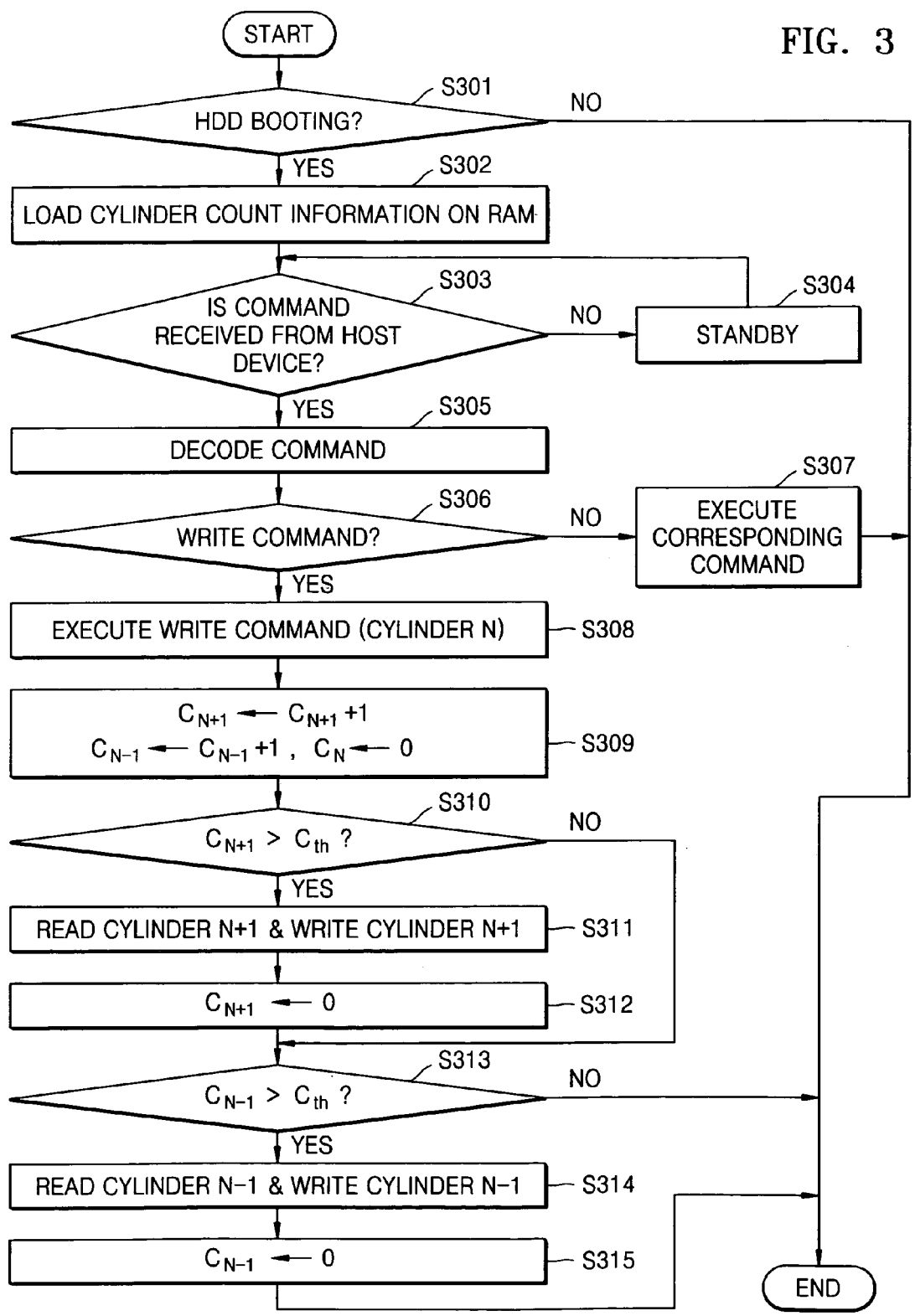
FIG. 3 is a flowchart illustrating an automatic data update method of the data storage system of FIG. 2 according to an embodiment of the present invention.

Referring to FIGS. 2 and 3, the controller 240 determines whether the hard disk drive is booting, a condition in which the hard disk drive is initialized (S301). The booting process is executed at a time period of power on.

If the booting process execution condition of the hard disk drive is satisfied, the controller 240 reads cylinder count information, which is stored in the maintenance field of the disk 12, and then loads it on the RAM 260 (S302). The cylinder count information is information on the count number of writing to adjacent tracks.

Then, the hard disk drive checks whether or not a command is received from the host device through the host interface 280 (S303). If the command is not received, the hard disk drive executes a standby mode and waits until the command is received from the host device (S304).

If the command is received, the controller 240 decodes the received command (S305). In other words, the controller 240 analyzes the kind of command and converts corresponding LBA position information into a physical C/H/S value.

Thereafter, the controller 240 identifies whether or not the received command is a write command (S306).

If the received command is not the write command, the corresponding command is executed and the process is ended (S307).

If the received command is the write command, the controller 240 moves the transducer 16 to a target cylinder N and then executes the write command, thereby writing data that are received from the host device and stored in the buffer 230 (S308).

After executing the write command, the controller 240 resets a cylinder count value CN of the written track to zero. Here, the cylinder count value CN is stored in the RAM 260. Cylinder count values CN+1 and CN−1 of cylinders N+1 and N−1 adjacent to the written cylinder N increase by unity (S309). Here, the cylinder count values CN+1 and CN−1 are stored in the RAM 260.

Then, it is checked whether or not the cylinder count value CN+1 of the cylinder N+1 exceeds a threshold value Cth (S310).

Here, the threshold value Cth is determined by a value that is given by subtracting the number of specified margin times from the number of write repetition times, at which data begin to be erased due to magnetization phenomenon caused by the repeated write operations to the adjacent tracks.

If the cylinder count value CN+1 of the written adjacent cylinder N+1 exceeds the threshold value Cth, the controller 240 controls to execute a cylinder (N+1) update (S311). That is, the data written on the cylinder N+1 are read and stored in the buffer 230, and then, the stored data of the cylinder N+1 are re-written to the cylinder N+1.

Then, the cylinder count value CN+1 of the cylinder N+1, which is stored in the RAM 260, is reset to zero (S312).

It is checked whether or not the cylinder count value CN−1 of the cylinder N−1 exceeds the threshold value Cth (S313).

If the cylinder count value CN−1 of the written adjacent cylinder N−1 exceeds the threshold value Cth, the controller 240 controls to execute a cylinder (N−1) update (S314). That is, the data written on the cylinder N−1 are read and stored in the buffer 230, and then, the stored data of the cylinder N−1 are re-written to the cylinder N−1.

Then, the cylinder count value CN−1 of the cylinder N−1, which is stored in the RAM 260, is reset to zero (S315).

If it is determined in operation S310 that the cylinder count value CN+1 of the cylinder N+1 does not exceed the threshold value Cth, the process proceeds to operation S313. Also, if it is determined in operation S313 that the cylinder count value CN−1 of the cylinder N−1 does not exceed the threshold value Cth, the process is ended.

In this manner, before data of the adjacent tracks are erased, they can be updated automatically by the repeated write operations in the adjacent tracks of the hard disk drive without modification of program and hardware of the host device, thus preventing data loss.

According to the described embodiment of the present invention, if the number of the write times in the adjacent tracks exceeds a specified threshold value, the data update of the adjacent cylinders is executed automatically. Therefore, the described embodiment of the present invention can prevent data of the adjacent tracks from being erased due to an increase of magnetic field during the repeated data write operations. In addition, these operations are not controlled by the host device but determined by the hard disk drive itself. The data update is executed automatically by the hard disk drive itself, such that the program of the host device need not be modified.

The described embodiment of the present invention can be applied as a method, an apparatus and a system. When the present invention is executed using software, elements of the present invention are code segments for necessary operations. Programs or code segments may be stored in a processor readable recording medium or may be transmitted over computer data signals that are coupled with carrier waves in transmission medium or communication network. The processor readable recording medium is any data storage device that can store or transmit information which can be thereafter read by a computer system. Examples of the processor readable recording medium includes electronic circuit, semiconductor memory, read-only memory (ROM), flash memory, erasable ROM (EROM), floppy disks, optical disks, hard disks, optical fiber medium, and RF network. The computer data signals include signals that can be propagated over transmission medium, such as electronic network channel, optical fiber, air, electromagnetic filed, and RF network.

It is contemplated that the described embodiment of the present invention can be applied to various kinds of hard disk drives and various kinds of data storage devices.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. An automatic data update method of a data storage system, comprising:
    executing a received write command to write on a track of a storage medium of the storage system;
    resetting to zero, for the written track of a storage medium, a number of times a write mode is executed;
    counting a number of times the write mode is executed in tracks adjacent to the written track of a storage medium;
    reading data stored in one of the tracks of the storage medium when the number of times the write mode is executed in any tracks adjacent to the one of the tracks exceeds a specified threshold value; and
    re-writing the read data to the one of the tracks.

2. The method of claim 1, wherein the number of the write mode executions in the adjacent tracks of each track is stored in a specified region of a disk and loaded on a memory when the data storage system is booted.

3. The method of claim 1, wherein the executing is performed before the resetting.

4. A hard disk drive, comprising:
    a disk which stores cylinder count information and user information, the cylinder count information being providing by accumulating a number of write mode executions in adjacent tracks of each track of a disk;
    a buffer which stores data received from a host device through a host interface in a write mode, and stores data read from the disk in a read mode;
    a controller which analyzes a received command and, when the command is a write command, the controller both increases the cylinder count information of tracks adjacent to a track which is to be written according to the write command and resets the cylinder count value of the track which is to be written according to the write command to zero and,
    when the cylinder count information of any of the adjacent tracks exceeds a specified threshold value, the controller reads out data stored in the any of the adjacent tracks and re-writes the read data to the same any of the adjacent tracks; and a write/read circuit which writes data stored in the buffer to the disk, or reads data from the disk and writes the read data to the buffer.

5. The hard disk drive of claim 4, wherein the controller stores the cylinder count information to the disk before the disk is powered off.

6. The hard disk drive of claim 4, wherein the controller loads the cylinder count value stored in the disk on the memory every time the hard disk drive is booted, and increases a to-be-written cylinder count value of the tracks adjacent to the track which is to be written according to the write command at every input of the write command, the to-be-written cylinder count value being stored in a memory.

7. A computer-readable storage medium encoded with processing instructions for implementing an automatic data update method which is performed by a computer, the method comprising:
   executing a received write command to write on a track of a storage medium;
   resetting to zero, for the written track of a storage medium, a number of times a write mode is executed;
   counting a number of times the write mode is executed in tracks adjacent to the written track of a storage medium;
   reading data stored in one of the tracks of the storage medium when the number of times the write mode is executed in any tracks adjacent to the one of the tracks exceeds a specified threshold value; and
   re-writing the read data to the one of the tracks.

8. A method of preventing data erasure, comprising:
   increasing a cylinder count of tracks adjacent to a written track after the written track has been written;
   resetting the cylinder count to zero for the written track;
   reading data stored in one of the adjacent tracks when the cylinder count of any of the adjacent tracks exceeds a specified threshold; and
   re-writing the read data to the adjacent track.

9. A method of preventing data erasure, comprising:
   storing cylinder count information relating to a number of writes operations performed in adjacent tracks of each track of a disk;
   storing data received from a host device in a write mode, and storing data read from the disk in a read mode; and
   analyzing a received command and, when the command is a write command, both increasing the cylinder count information of tracks adjacent to a track which is to be written according to the write command and resetting the cylinder count information of the track, which is to be written, to zero, and, when the cylinder count information of any of the adjacent tracks exceeds a specified threshold, reading out data stored in the any of the adjacent tracks and re-writing the read data to the same any of the adjacent tracks.

10. A computer readable storage medium encoded with processing instructions for causing a computer to perform a method of preventing data erasure, the method comprising:
    writing data to write on a track of a storage medium;
    resetting to zero the number of times the written track has been written;
    counting a number of times tracks adjacent to the written track are written;
    reading data stored in an adjacent track when the number of times any of the adjacent tracks are written exceeds a specified threshold; and
    re-writing the read data to the adjacent track.

11. A computer readable storage medium encoded with processing instructions for causing a computer to perform a method of preventing data erasure, the method comprising:
    storing cylinder count information relating to a number of writes operations performed in adjacent tracks of each track of a disk;
    storing data received from a host device in a write mode, and storing data read from the disk in a read mode; and
    analyzing a received command and, when the command is a write command, increasing the cylinder count information of tracks adjacent to a track which is to be written according to the write command and resetting the cylinder count information of the track, which is to be written, to zero and, when the cylinder count information of any of the adjacent tracks exceeds a specified threshold, reading out data stored in the any of the adjacent tracks and re-writing the read data to the same any of the adjacent tracks.

* * * * *